United States Patent
Boddhu et al.

(10) Patent No.: US 9,910,723 B2
(45) Date of Patent: *Mar. 6, 2018

(54) EVENT DETECTION THROUGH TEXT ANALYSIS USING DYNAMIC SELF EVOLVING/LEARNING MODULE

(71) Applicant: QBASE, LLC, Reston, VA (US)

(72) Inventors: Sanjay Boddhu, Dayton, OH (US); Rakesh Dave, Dayton, OH (US)

(73) Assignee: QBase, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,145

(22) Filed: Jan. 9, 2017

(65) Prior Publication Data
US 2017/0116054 A1  Apr. 27, 2017

Related U.S. Application Data

(63) Continuation of application No. 14/558,342, filed on Dec. 2, 2014, now Pat. No. 9,544,361.

(60) Provisional application No. 61/910,818, filed on Dec. 2, 2013.

(51) Int. Cl.
*G06F 17/30* (2006.01)
*G06F 7/00* (2006.01)
*G06F 9/54* (2006.01)
*G06N 99/00* (2010.01)

(52) U.S. Cl.
CPC ........ *G06F 9/542* (2013.01); *G06F 17/30864* (2013.01); *G06N 99/005* (2013.01)

(58) Field of Classification Search
CPC .... G06N 99/005; G06F 17/2765; H04L 67/10
USPC ........................................... 707/758
See application file for complete search history.

(56) References Cited

U.S. PATENT DOCUMENTS

| | | |
|---|---|---|
| 6,128,660 A | 10/2000 | Grimm et al. |
| 6,178,529 B1 | 1/2001 | Short et al. |
| 6,266,781 B1 | 7/2001 | Chung et al. |
| 6,353,926 B1 | 3/2002 | Parthesarathy et al. |
| 6,678,635 B2 * | 1/2004 | Tovinkere ............... G06N 5/04 702/176 |
| 6,738,759 B1 | 5/2004 | Wheeler et al. |

(Continued)

FOREIGN PATENT DOCUMENTS

WO  2013/003770 A2  1/2013

OTHER PUBLICATIONS

United States Notice of Allowance issued in U.S. Appl. No. 14/558,342 dated Sep. 1, 2016.
(Continued)

*Primary Examiner* — Kuen S Lu
(74) *Attorney, Agent, or Firm* — Eric L. Sophir; Dentons US LLP (57) ABSTRACT

A system and method for detecting events based on input data from a plurality of sources. The system may receive input from a plurality of sources containing information about possible events. A method for event detection involves pre-processing and normalizing a data input from a plurality of sources, extracting and disambiguating events and entities, associate event and entities, correlate events and entities associated from a data input to results from a different data source to determine if an event has occurred, and store the detected events in a data storage.

10 Claims, 6 Drawing Sheets

(56) References Cited

U.S. PATENT DOCUMENTS

| | | | |
|---|---|---|---|
| 6,832,373 | B2 | 12/2004 | O'Neill |
| 7,058,846 | B1 | 6/2006 | Kelkar et al. |
| 7,370,323 | B2 | 5/2008 | Marinelli et al. |
| 7,421,478 | B1 | 9/2008 | Muchow |
| 7,447,940 | B2 | 11/2008 | Peddada |
| 7,543,174 | B1 | 6/2009 | van Rietschote et al. |
| 7,681,075 | B2 | 3/2010 | Havemose et al. |
| 7,818,615 | B2 | 10/2010 | Krajewski et al. |
| 7,899,871 | B1* | 3/2011 | Kumar .................... H04L 51/16 709/206 |
| 8,055,933 | B2 | 11/2011 | Jaehde et al. |
| 8,122,026 | B1 | 2/2012 | Laroco et al. |
| 8,341,622 | B1 | 12/2012 | Eatough |
| 8,345,998 | B2 | 1/2013 | Malik et al. |
| 8,356,036 | B2 | 1/2013 | Betchel et al. |
| 8,375,073 | B1 | 2/2013 | Jain |
| 8,423,522 | B2 | 4/2013 | Lang et al. |
| 8,429,256 | B2 | 4/2013 | Vidal et al. |
| 8,726,267 | B2 | 5/2014 | Li et al. |
| 8,782,018 | B2 | 7/2014 | Shim et al. |
| 8,995,717 | B2 | 3/2015 | Cheng et al. |
| 9,009,153 | B2 | 4/2015 | Kahn et al. |
| 9,025,892 | B1 | 5/2015 | Lightner et al. |
| 9,032,387 | B1 | 5/2015 | Hill et al. |
| 2001/0037398 | A1 | 11/2001 | Chao et al. |
| 2002/0165847 | A1 | 11/2002 | McCartney et al. |
| 2002/0174138 | A1 | 11/2002 | Nakamura et al. |
| 2003/0028869 | A1 | 2/2003 | Drake et al. |
| 2003/0112792 | A1 | 6/2003 | Cranor et al. |
| 2003/0158839 | A1 | 8/2003 | Faybishenko et al. |
| 2003/0182282 | A1 | 9/2003 | Ripley |
| 2004/0027349 | A1 | 2/2004 | Landau et al. |
| 2004/0143571 | A1 | 7/2004 | Bjornson et al. |
| 2004/0153869 | A1 | 8/2004 | Marinelli et al. |
| 2004/0205064 | A1 | 10/2004 | Zhou et al. |
| 2004/0215755 | A1 | 10/2004 | O'Neill |
| 2005/0192994 | A1 | 9/2005 | Caldwell et al. |
| 2006/0101081 | A1 | 5/2006 | Lin et al. |
| 2006/0294071 | A1 | 12/2006 | Weare et al. |
| 2007/0005639 | A1 | 1/2007 | Gaussier et al. |
| 2007/0203693 | A1 | 8/2007 | Estes |
| 2007/0203924 | A1* | 8/2007 | Guha ................ G06F 17/30716 |
| 2007/0240152 | A1 | 10/2007 | Li et al. |
| 2007/0250519 | A1 | 10/2007 | Fineberg et al. |
| 2007/0282959 | A1 | 12/2007 | Stern |
| 2008/0010683 | A1* | 1/2008 | Baddour ........... G06F 17/30864 726/24 |
| 2008/0027920 | A1 | 1/2008 | Schipunov et al. |
| 2009/0019013 | A1 | 1/2009 | Tareen et al. |
| 2009/0043792 | A1 | 2/2009 | Barsness et al. |
| 2009/0049038 | A1 | 2/2009 | Gross |
| 2009/0089626 | A1 | 4/2009 | Gotch et al. |
| 2009/0094484 | A1 | 4/2009 | Son et al. |
| 2009/0240682 | A1 | 9/2009 | Balmin et al. |
| 2009/0292660 | A1* | 11/2009 | Behal .................... G06N 99/005 706/12 |
| 2009/0299999 | A1* | 12/2009 | Loui ................ G06F 17/30256 |
| 2009/0322756 | A1 | 12/2009 | Robertson et al. |
| 2010/0077001 | A1 | 3/2010 | Vogel et al. |
| 2010/0138931 | A1* | 6/2010 | Thorley ................ G06F 21/552 726/27 |
| 2010/0223264 | A1 | 9/2010 | Brucker et al. |
| 2010/0235311 | A1 | 9/2010 | Cao et al. |
| 2010/0274785 | A1 | 10/2010 | Procopiuc et al. |
| 2011/0071975 | A1 | 3/2011 | Friedlander et al. |
| 2011/0093471 | A1 | 4/2011 | Brockway et al. |
| 2011/0119243 | A1 | 5/2011 | Diamond et al. |
| 2011/0125764 | A1 | 5/2011 | Carmel et al. |
| 2011/0296397 | A1 | 12/2011 | Vidal et al. |
| 2012/0030220 | A1 | 2/2012 | Edwards et al. |
| 2012/0059839 | A1 | 3/2012 | Andrade et al. |
| 2012/0102121 | A1 | 4/2012 | Wu et al. |
| 2012/0117069 | A1* | 5/2012 | Kawanishi ......... G06K 9/00664 707/740 |
| 2012/0131139 | A1* | 5/2012 | Siripurapu ........ G06F 17/30864 709/217 |
| 2012/0246154 | A1 | 9/2012 | Duan et al. |
| 2012/0310934 | A1 | 12/2012 | Peh et al. |
| 2012/0323839 | A1 | 12/2012 | Kiciman et al. |
| 2013/0132405 | A1 | 5/2013 | Bestgen et al. |
| 2013/0166480 | A1 | 6/2013 | Popescu et al. |
| 2013/0166547 | A1 | 6/2013 | Pasumarthi et al. |
| 2013/0290232 | A1 | 10/2013 | Tsytsarau et al. |
| 2013/0303198 | A1* | 11/2013 | Sadasivam ............ H04W 4/023 455/456.5 |
| 2014/0013233 | A1* | 1/2014 | Ahlberg .............. G06F 3/04842 715/739 |
| 2014/0022100 | A1 | 1/2014 | Fallon et al. |
| 2014/0156634 | A1 | 6/2014 | Buchmann et al. |
| 2014/0244550 | A1 | 8/2014 | Jin et al. |
| 2014/0351233 | A1 | 11/2014 | Crupi et al. |
| 2015/0074037 | A1 | 3/2015 | Sarferaz |
| 2015/0154079 | A1 | 6/2015 | Lightner et al. |
| 2015/0154264 | A1 | 6/2015 | Lightner et al. |
| 2015/0154297 | A1 | 6/2015 | Lightner et al. |

OTHER PUBLICATIONS

Tunkelang, D. "Faceted Search," Morgan & Claypool Publ., 2009, pp. 1-79.

Schuth, A. et al., "University of Amsterdam Data Centric Ad Hoc Faceted Search Runs," ISLA, 2012, pp. 155-170.

Tools, Search Query Suggestions Using ElasticSearch via Shingle Filter and Facets, Nov. 2012, pp. 1-12.

International Search Report and Written Opinion issued in International Patent Application No. PCT/US2014/067921 dated Mar. 5, 2015, 10 pages.

International Search Report and Written Opinion issued in International Patent Application No. PCT/US2014/067999 dated Mar. 10, 2015, 10 pages.

International Search Report and Written Opinion issued in International Patent Application No. PCT/US2014/068002 dated Apr. 15, 2015, 10 pages.

International Search Report and Written Opinion issued in International Patent Application No. PCT/US2014/067918 dated Feb. 24, 2015, 10 pages.

United States Final Office Action issued in U.S. Appl. No. 14/558,342 dated Sep. 11, 2015.

International Search Report and Written Opinion issued in International Patent Application No. PCT/US2014/067993 dated Mar. 6, 2015, 9 pages.

United States Non-Final Office Action issued in U.S. Appl. No. 14/558,342 dated Mar. 27, 2015.

International Search Report and Written Opinion issued in International Patent Application No. PCT/US2014/067921 dated Mar. 3, 2015, 10 pages.

United States Notice of Allowance issued in U.S. Appl. No. 14/558,300 dated Jun. 3, 2015.

United States Non-Final Office Action issued in U.S. Appl. No. 14/558,300 dated May 8, 2015.

* cited by examiner

EVENT DETECTION THROUGH TEXT ANALYSIS USING DYNAMIC SELF EVOLVING/LEARNING MODULE

CROSS-REFERENCE TO RELATED APPLICATIONS

This application is a continuation of U.S. Utility application Ser. No. 14/558,342, entitled "Event Detection Through Text Analysis Using Dynamic Self Evolving/Learning Module," filed on Dec. 2, 2014, which claims a benefit of priority to U.S. Provisional Application Ser. No. 61/910,818, entitled "Event Detection Through Text Analysis Using Dynamic Self Evolving/Learning Module," filed on Dec. 2, 2013, which is fully incorporated by reference herein for all purposes.

This application is related to U.S. patent application Ser. No. 14/558,300, entitled "Event Detection Through Text Analysis Using Trained Event Template Models," filed Dec. 2, 2014, now U.S. Pat. No. 9,177,254, which is hereby fully incorporated by reference herein for all purposes.

TECHNICAL FIELD

The present disclosure relates in general to information data mining from media sources, and more specifically to a self-building event concept store for use in event detection, extraction and validation from different data sources.

BACKGROUND

The internet provides several sources of information which may be exploited. Internet news feeds and websites that allow users to interact with one another have exploded in popularity in the last few years. news feed channels such as CNN®, social networking websites sites such as Facebook® or LinkedIn®, and microblogging websites such as Twitter® enjoy widespread use. Millions of users post messages, images and videos on such websites on a daily, even hourly basis. Often, information gathered from these sources may refer to events taking place in real time. Such publicly accessible media may serve as a rich mine of information that may be used in different applications. For example, consider a scenario where a wide area emergency such as an earthquake or a flood has occurred and conventional emergency service lines are stressed beyond capacity; in this case users may turn to social media in order to request assistance. Another example of an event taking place in real time may be news feed reporting on civilians trapped under a building.

The high proliferation of information generated by media sources makes proper identification of events troublesome. New event types may continually emerge and may be hard to detected due to lack of information.

Thus, a need exists for a method of detecting and building new event models from one or more information sources.

SUMMARY

The system allows for the detection of events happening, and the proper association of those detected event to disambiguated entities using text analysis applied against different sources of information, which may be publishing data streams containing the information in a machine-readable digital format. Systems and methods described herein provide processes of learning different event types by extracting entities and topic vectors from a data source, such as a machine-readable word processing file, and comparing extracted entities and topic vectors against records of entities and topic vectors stored in a knowledgebase. The system may determine whether "new knowledge" has been identified in the extracted entities and topic vectors if the system determines that a particular combination of events, topics, and entities does not exist in the records within the knowledgebase; and so a new records for the new knowledge is generated. Embodiments may validate the new knowledge (combination of extracted entities, topics, and events) based on frequency of occurrence in a corpus.

In one embodiment, a computer-implemented method comprises identifying, by a computer, one or more features of a data stream associated with a data source, wherein at least one feature is an event candidate; automatically determining, by the computer, whether the one or more features identified in the data stream satisfy one or more event models in a categorization table, based upon the computer comparing the one or more features of the data stream against the one or more event models, wherein the event concept store comprises a non-transitory machine-readable memory storing the one or more event models; and responsive to the computer determining that the one or more features from the data stream fail to satisfy at least one event model in at least one categorization table stored in the event concept store: comparing, by the computer, the one or more features against one or more uncategorized event models in an uncategorized event table stored in the event concept store; and storing, by the computer, the one or more features as a new uncategorized event model in the uncategorized event table, in response to determining the one or more features fail to satisfy at least one uncategorized event model.

In another embodiment, a system comprising one or more nodes storing one or more event models, one or more event categorization tables, and an uncategorized event table, wherein each event model is associated with an event candidate and further comprises a threshold event score and a set of one or more features, wherein each event categorization table comprises one or more known event models, and wherein the uncategorized event table comprises a set of one or more features, a set of one or more entities, and a set of one or more topics, each associated with one or more uncategorized event models; and an event category validation processor configured to: receive a set of extracted features, a set of extracted entities, and a set of extracted topics; compare each of the sets with the one or more event categorization tables to determine whether the extracted features, entities, and topics, correspond to a known event model; and then compare each of the sets with the uncategorized event table to determine whether the extracted features, entities, and topics, correspond with an uncategorized event model.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

As used here, the following terms may have the following definitions:

"Entity extraction" refers to information processing methods for extracting information such as names, places, and organizations.

"Corpus" refers to a collection of one or more documents.

"Features" is any information which is at least partially derived from a document.

"Event Concept Store" refers to a database of Event template models.

"Event" refers to one or more features characterized by at least its occurrence in time.

"Event Model" refers to a collection of data that may be used to identify a specific type of event.

"Module" refers to a computer or software components suitable for carrying out at least one or more tasks.

"Event Model Candidate" refers to the possible event model that may match a real event referenced in a data source.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

The present disclosure describes a system and method for detecting, extracting and validating events from a plurality of sources. Sources may include news sources, social media websites and/or any sources that may include data pertaining to events.

A system and method for detecting events based on input data from a plurality of sources such as, social media, news feeds and/or a corpus of documents is disclosed. The system may include a self learning event concept store that may store pre-determined event models and detect and build new event models based on input data from a plurality of sources. The system may receive input from a plurality of sources in the way of natural language unstructured text containing information about real time events. The system may use natural language processing techniques in order to separate individual entities and keywords and topic extraction techniques to identify topics. The process may then proceed with an entity disambiguation step and identify specific entities the source may be referring. The system may then identify independent events and associate them with the specific entities identified in the same data source. The process may then validate events based on overlapping and co-occurrence of events and entities from other data sources.

The system allows for the detection of events happening, and their proper association to disambiguated entities through text analysis of different sources.

Various embodiments of the systems and methods disclosed here collect data from different sources in order to identify independent events.

Figure 1:
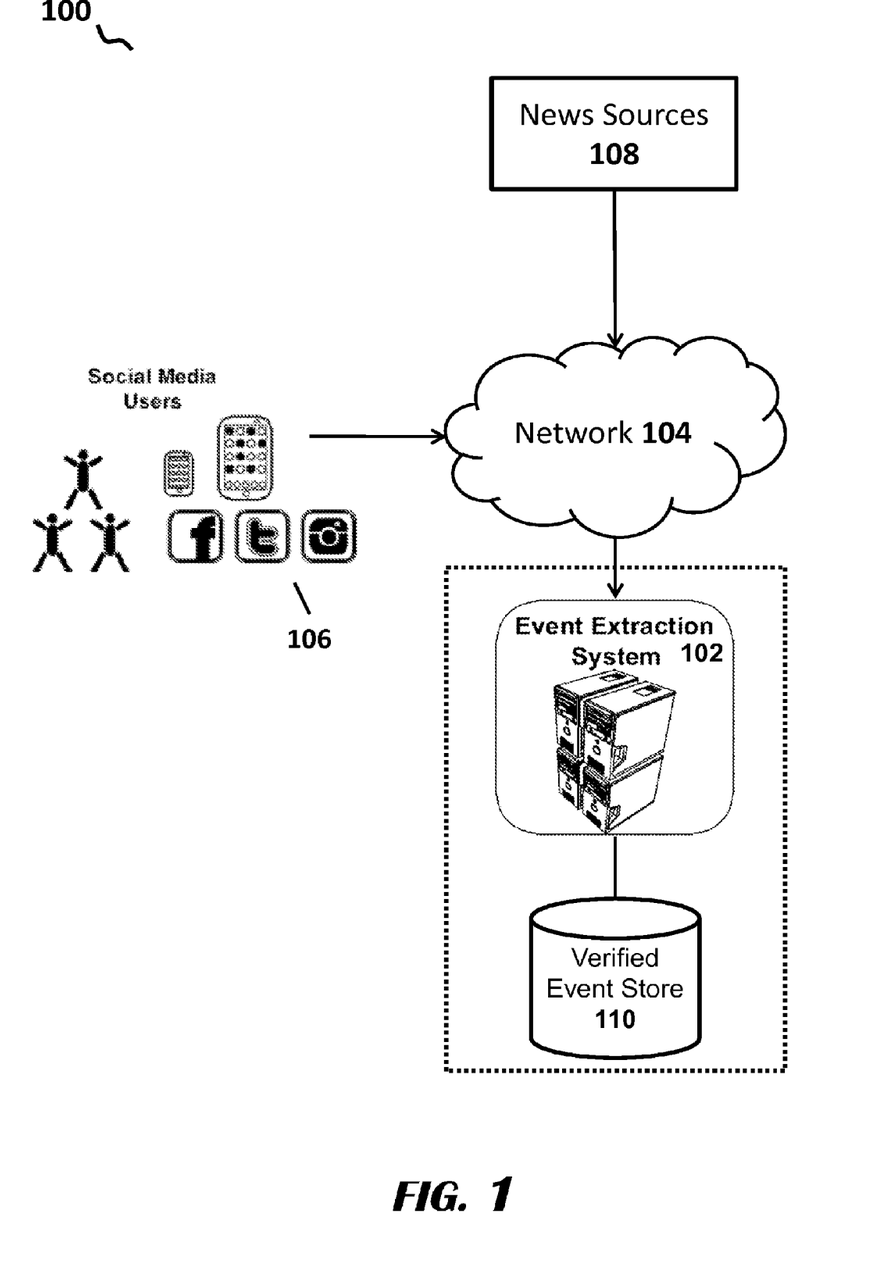
FIG. 1 is a high level functional view of an event extraction system, according to an embodiment.

FIG. 1 shows components of a system 100 comprising external data sources 106, 108 communicatively coupled over a network 104 to an event extraction system 102. Event extraction system 102 may receive data from a plurality of data sources 106, 108 through a network 104. Non-limiting examples of data sources 106, 108 may include social media 106, subscription or news sources 108, though other data sources 106, 108 that store and/or publish information may be implemented such as, for example, a document corpus of historical events. Such data sources 106, 108 may store and/or publish machine-readable data representing unstructured texts such as, for example, Tweets® (i.e., text strings), a news article, or a Facebook® status message.

A network 104 may be a connection between the different sources and event extraction system 102 through the Internet or an intranet. The network 104 may comprise any suitable collection of hardware and software components (e.g., network interface cards, routers, switches, firewalls, antennas, towers, hubs, trunks) capable of supporting networked communications between computing devices through any suitable protocol (e.g., TCP/IP, 3G, 4G, Bluetooth).

Event extraction system 102 may include a plurality of components (not illustrated in FIG. 1) capturing and processing data received from a plurality of data sources 106, 108. Event extraction system 102 may comprise software with programmatic logic that may process inputs from the data sources 106, 108, and then identity and extract independent events and entities. Event extraction system 102 may be implemented in a single server computer or in a distributed architecture across a plurality of server computers.

Event extraction system 102 may store extracted events in event store 110. Event store 110 may be a database implemented in known in the art database management systems (DBMS) such as, for example, MySQL®, PostgreSQL, SQLite, Microsoft SQL Server®, Microsoft Access®, Oracle®, SAP®, dBASE, FoxPro®, IBM DB2®, LibreOffice Base®, FileMaker Pro®, and/or any other type of database that may organize collections of data. Event store 110 may also be a No-SQL database such as, for example, MongoDB®, Couchbase®, H-Base®, Cassandra®, Accumulo®, and/or any other type of database that may organize collections of data.

Data sources 106, 108 may be any form of computing service that stores, publishes, transmits, or otherwise makes available over a network 104 data representing information about events and entities. Data sources 106, 108 may comprise one or more computing devices, servers, and other computing hardware capable of storing data, such as a database, and publishing data over a network 104, such as a webserver. Non-limiting examples of data sources 106, 108 may include social media networks 106, online news sources 108, blogs, educational portals (e.g., Blackboard®, online university libraries), online journals and magazines, among others. Social media 106 may be any computing service hosting on one or more servers information exchanges between users. Social media 106 users may publish webpages containing text, hyperlinks, and/or other forms of media that is then viewable by other users. New sources 108 may be any computing service hosting on one or more servers a web-based new outlet that publishes webpages containing text, hyperlinks, and/or other forms of media. Data sources 106, 108 may publish data containing information that may be received and analyzed by an event extraction system 102 via webpages (e.g., HTML, PHP), RSS, e-mail, SMS, or other suitable protocol for publishing information across a computing network 104.

Figure 2:
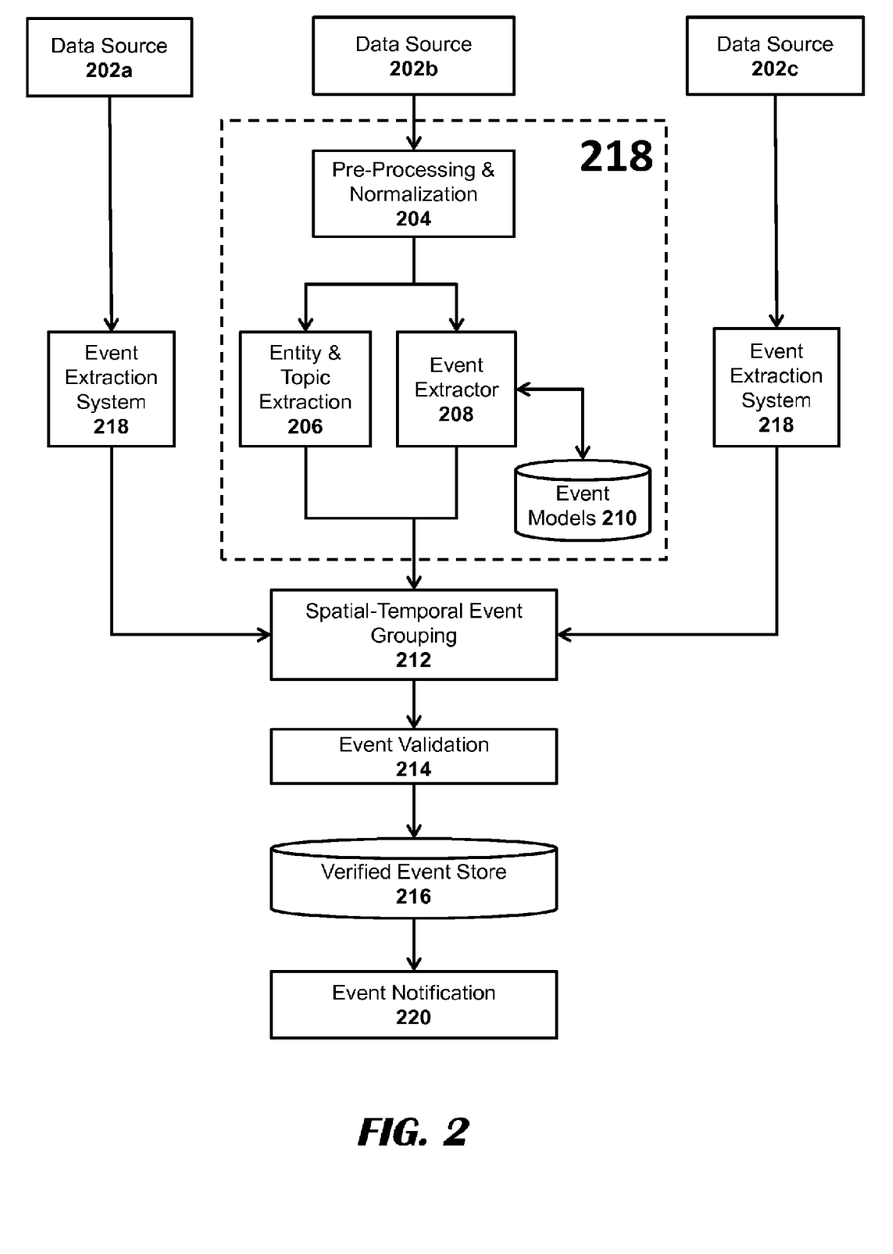
FIG. 2 is a flow diagram illustrating a process by which events and entities from different sources are extracted, validated and stored, according to an embodiment.

FIG. 2 is a flow diagram of an event extraction method 200 according to an embodiment. Event extraction method 200 may begin when data is received from one or more data sources 202. Data sources 202 may include social media computing services 202a, web-based news sources 202b, and/or any other data sources 202c that store and/or publish data containing information related to events.

In a first step 218, after event extraction system receives data from one or more data sources 202, event extraction system may perform event, topic and entity extraction, which may include the sub-steps 204 (pre-processing and data normalization), 206 (entity and topic extraction, and disambiguation), and 208 (event extraction).

In a first sub-step 204, pre-processing and data normalization may be performed by a software module implemented on a computer as part of an event extraction system performing event, topic and entity extraction 218. A module performing pre-processing and data normalization, first sub-step 204, may contain programmatic logic, which may involve the use of natural language processing techniques (NLP) for identifying key features in data received from a data source 202. Non-limiting examples of NLP techniques may include removing stop words, tokenization, stemming and part-of speech tagging among others know in the art.

In a next sub-step 206, after a pre-processing and data normalization sub-step 204, normalized pre-processed data may go through an entity/topic extraction and disambiguation, in which a software module of the event extraction system may identify and extract entities from the data and disambiguate independent entities from one another. Non-limiting examples of entities may include people, organizations, geographic locations, medical conditions, weapons, dates, time or any other entities. Entity and topic identification, extraction, and disambiguation of sub-step 206, may be performed by one or more software module implemented in a computer as part of event extraction system.

In a simultaneous, subsequent, or previous sub-step 208, an event extractor software module may identify possible event model candidates in the text received from the data source 202. Different types of events may include an accident (e.g., car accident, a train accident, etc.), a natural disaster (e.g., an earthquake, a flood, a weather event, etc.), a man-made disaster (e.g., a bridge collapse, a discharge of a hazardous material, an explosion, etc.), a security event (e.g., a terrorist attack, an act of war, etc.), a major sporting event or concert, election day coordination, traffic incident, and/or any other event. Latent Dirichlet Allocation (LDA), or other methods of detecting and extracting events may be used to extract events. The event extractor module performing sub-step 208 may be executed in conjunction with an event concept store 210. Event concept store 210 may be a database residing on any suitable computing device comprising non-transitory machine-readable storage media that stores event models. Event models may be compared against event model candidates identified in data. That is, in sub-step 208, the event extractor module may identify types of features, which in this example are keywords, in the normalized pre-processed data received from the data source 202, and compare the features against event models stored in the event concept store 210. The event extractor module may then compute a likelihood score representing the likelihood a set of features (e.g., keywords) pertains to a certain event model, based on comparing the features against each of the event models stored in the event concept store 210. In some implementations, a comparison between features of a event model candidate and a event model yielding a score between determined thresholds may indicate that the event model being compared is actually referenced in the data source.

In a next step 212, after event, topic, and entity extraction of step 218, the process may perform a spatial-temporal event grouping of extracted events and entities. That is, entities extracted from a data received from a data source 202b as a result of executing step 206 (entity extraction and disambiguation), and event model candidates identified in data step 202b during execution of step 208 (event extraction) may be associated together, as a spatial-temporal grouping, and then stored in non-transitory machine-readable storage memory. In cases having a plurality of data sources 202a-c, event model candidates identified in other data sources 202a, 202c and entities extracted from other data sources 202a, 202c may also be associated with one another, and then included to the spatial-temporal event grouping.

In a next step 214, after generating spatial-temporal event groupings based on entities and event model candidates extracted from data sources 202, software modules may perform event validation on the event model candidates in the spatial temporal event groupings. Event validation modules may compare spatial-temporal groupings (i.e., event model candidates and associated entities) extracted from different data sources 202a-c in order to determine whether a particular event model candidate extracted from a particular data source 202b resembles a real-time event being referenced in the different data sources 202a, 202c. Spatial-temporal groupings of different data sources 202a, 202c resembling a co-occurrence of event model candidates and entities of the particular data source 202b being validated may serve as validation that the event model candidate of the data source 202b resembles the event occurring in real-time.

Once validated in step 214, the event model candidate and the associated entitles extracted from the data source 202b may be stored into a verified event store 216 database. For example, a server publishing text strings of a Twitter® feed may contain information describing a car accident in Washington D.C., while a news feed channel (e.g., text-based RSS) may contain text strings describing a car accident and high traffic jam in an area nearby the location referenced in the Twitter® feed. In this example of step 214, an event validation software module may calculate a probability score that both text-based streams of data are describing the same real-world event. When the probability score reaches an established threshold, the event may be considered verified and thus stored into the verified event store 216.

In some embodiments, a verified event store 216 may be used by different applications in order to query for different events depending on the purpose of the application. For example, an emergency service application may query for events related to vehicle accidents, fires and the like in order to provide first responders assistance. Another example may be a sports application which may query the database in order to determine the latest information in the NFL® Super Bowl®.

Event notification 220 may be used to push notifications or alerts to subscribers who wish to be notified immediately when events are verified. Once an event is verified, any subscribers who wish to receive notifications for that event type will be notified of the verified event.

Figure 3:
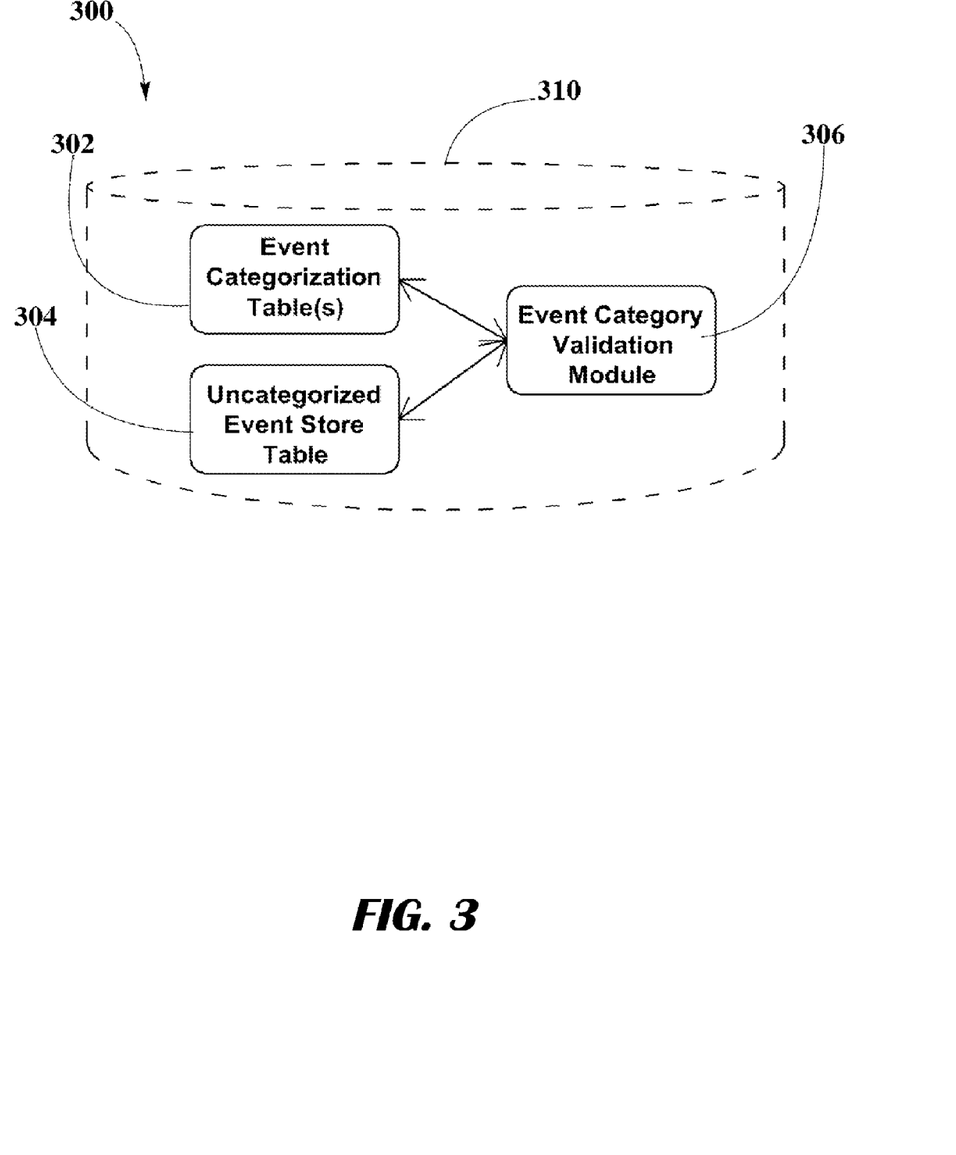
FIG. 3 is component diagram for a dynamic event concept store, according to an embodiment.

FIG. 3 shows an internal view of a dynamic event concept store 310 of a system 300, according to an exemplary embodiment.

A dynamic event concept store 310 may be a database that resides on any suitable computing device comprising non-transitory machine-readable storage media storing one or more event models. The event models stored in the event concept store 310 may be compared against event model candidates identified in data received from data sources. The event concept store 310 may store one or more event categorization table 302 components, uncategorized event table 304 components, and event category validation modules 306. Event categorization tables 302, uncategorized event tables 304 and event category validation modules 306 may be stored on a non-transitory machine-readable storage of a single computer. However, it should be appreciated that event categorization tables 302, uncategorized event tables 304 and/or event category validation modules 306 may be distributed across multiple computers.

An event categorization table 302 may store records that contain previously identified event models, which the extraction module may retrieve to compare against text strings in data received from a data source, when extracting events from the data source.

An uncategorized event table 304 may store records containing keywords, entities, and/or topics that may be associated with a possible new unknown and/or unnamed event model and a probability score, which may serve as an indication of the likelihood that the keywords, entities, and/or topics represent a new event model.

An event category validation module 306 may be a software module executed by one or more suitable computing devices performing various tasks for validating event models. The event validation module 306 may receive a set of keywords, entities, and/or topics from a data source comprising data in the form of text strings. The event validation module 306 may then determine whether the keywords, entities, and/or topics in the set represent an existing event model or a possible previously unknown event model. Existing event models may be stored in records of an event categorization table 302. Previously unknown event models may be stored in records of an uncategorized event table 304.

Figure 4:
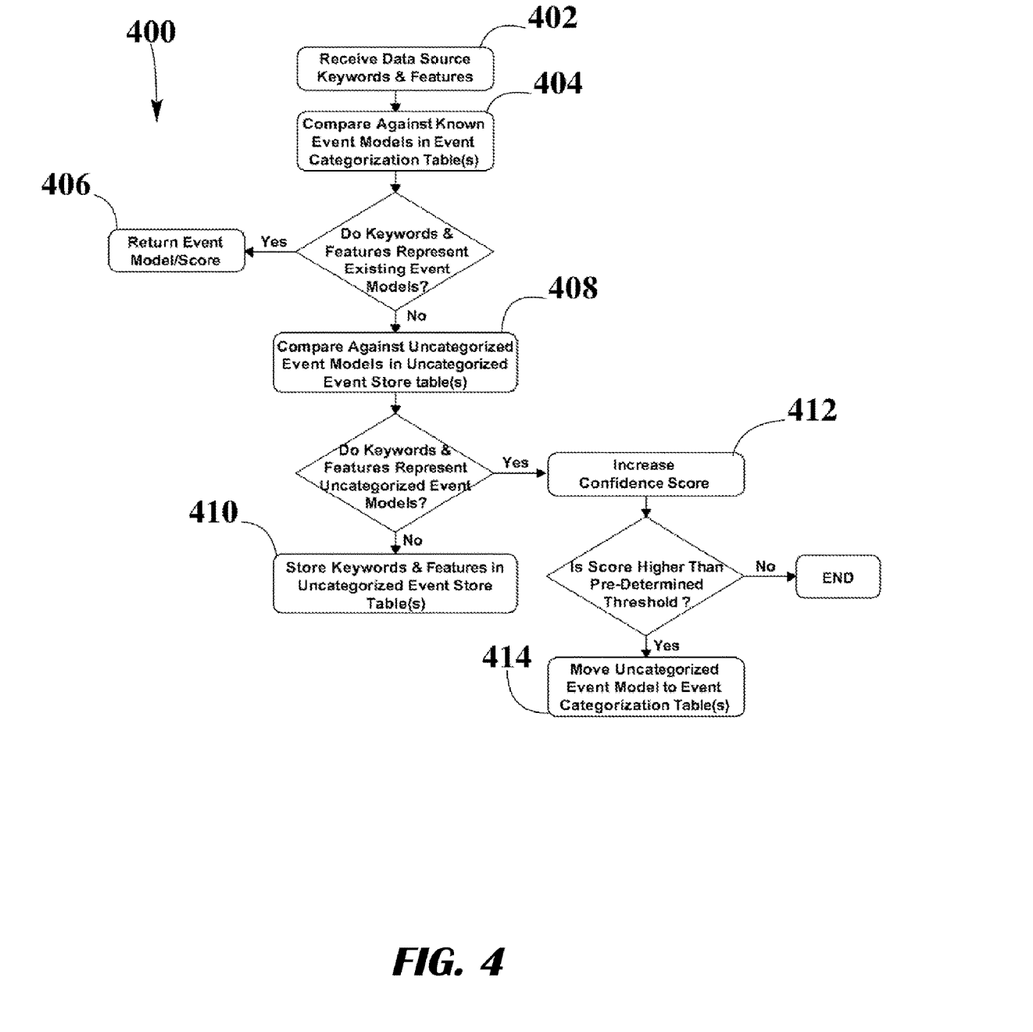
FIG. 4 is workflow diagram illustrating the process of self learning of a dynamic event concept store, according to an embodiment.

FIG. 4 shows steps of a category validation process 400 executed by one or more computing devices of a system, according to an exemplary method embodiment.

Category validation process 400 may begin, in a first step 402, when computers of the system receive data streams from one or more data sources and then extract one or more features (in this example the features are keywords) from the data streams.

In a next step 404, a computer may compare keywords and/or other extracted features against event models stored in records of one or more event categorization tables, which may be stored in an event concept store. Based on the comparisons, the computer may automatically determine whether the keywords and features extracted from a data stream resemble existing event models stored in the event categorization tables.

In the event the computer determines that the keywords and/or other features extracted from the data of the data stream resembling, modeling, matching, or otherwise satisfying a known event model in an event categorization table, then the computer may execute a next step 406. In the resulting step 406, the computer may extract or otherwise identify which of the event models determined to resemble or model an event candidate extracted or identified in the data. That is, the extracted keywords and/or other features may resemble, model, or otherwise satisfy an event model associated with an event candidate. When the computer determines that the features satisfy the event model, then the computer extracts or otherwise identifies the event candidate from the data of the data stream. In some cases, the exemplary process 400 may come to an end, after the computer extracts or otherwise identifies the event candidate associated with the event model satisfied by the keywords and/or other features.

In the event the computer determines that the keywords and/or other features of the data do not resemble, model, match, or other satisfy any of the known event models stored in any of the event categorization tables, then the computer may perform an alternative optional step 408. In next step 408, the computer may compare the keywords and/or other features extracted or otherwise identified in the data against uncategorized event models stored in uncategorized event tables in the event concept store.

In the event the keywords and features do not resemble, model, match, or other satisfy an uncategorized event model stored in uncategorized event table, the computer may execute a optional step 410. In the resulting step 410, the keywords and features may be stored in a new record of an uncategorized event table of the event concept store. The new record of the keywords and features may represent a previously unknown or undiscovered event model, i.e., new knowledge, which may be compared against future keywords and/or features.

In the event the keywords and/or features resemble, model, match, or otherwise satisfy an uncategorized event model in the uncategorized event table, the computer may execute an alternative option step 412. In the resulting step 412, the probability score, or confidence score, associated with the uncategorized event model may be increased, thereby increasing the certainty that those particular keywords and features resemble an undiscovered event. That is, in some embodiments, the frequency at which a particular set of keywords and/or features may be used to validate a previously unknown or undiscovered event model, identified in one or more data streams. After the computer increases the confidence score of the uncategorized event model, the confidence score may be compared against a pre-determined threshold of the uncategorized event model. The pre-determined threshold of the uncategorized event model may be the minimum confidence score required to indicate that the set of keywords and features strongly resemble a real event type. Using the confidence score of the uncategorized event model, the computer may determine whether confidence score is higher than the pre-determined threshold.

In the event the computer determines the confidence score of the uncategorized event model is higher than or otherwise satisfies a threshold score for the event model, then in resulting step 414, the computer may move the event model for the uncategorized event to an event categorization table. That is, the computer may remove a record of the event model from the uncategorized event table, and then store a record of the event model into an event categorization table. On the other hand, if the computer determines the confidence score is lower than or otherwise fails to satisfy the threshold score for the event model, then the process 400 may end.

Figure 5:
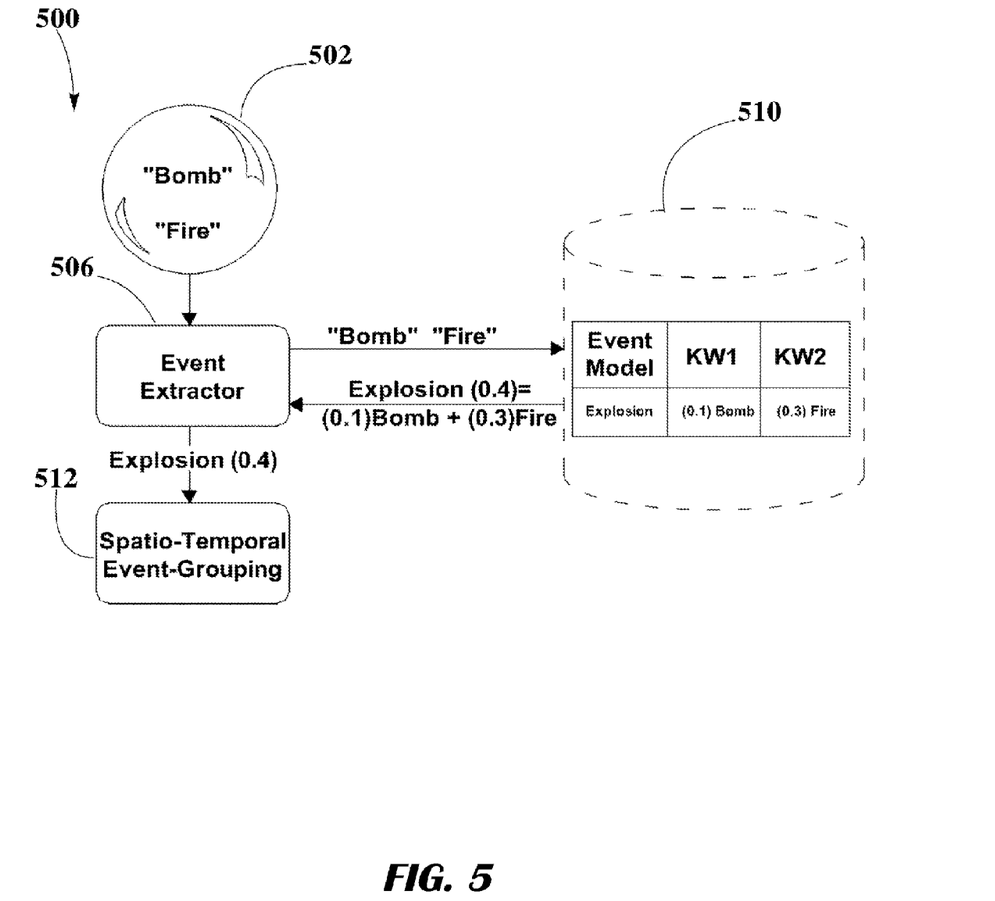
FIG. 5 is an example embodiment of a detailed event extraction process using an event concept store, according to an embodiment.

FIG. 5 is an example embodiment of an event detection process 500. An event extractor 506 may identify features, which in this example are keywords 502, from a data input. In the illustrated example, the keywords "Bomb" and "Fire" are identified. The keywords may then be submitted for comparison against event models in the event concept store 510. In this example, event concept store 510 may assign weights of 0.1 to "Bomb" and 0.3 to "Fire" for the event model of "Explosion". Event extractor 506 may then add up the weighted scores and determine if the resulting score exceeds a determined threshold. In this example a 0.4 score is generated for the probability of the event being an "Explosion"; however other methods of calculating weighted scores may be used and are included within the scope of this disclosure. Event extractor 506 may then transfer an event possibility of 0.4 of explosion to spatial-temporal event grouping 512.

After pre-processing and normalization, entity extraction and disambiguation, and event extraction, each of the identified event model candidates and associated entities/topics from each of the different sources may be grouped together in a spatial-temporal event grouping 512, which may be stored as a record of the spatial-temporal grouping 512.

Figure 6:
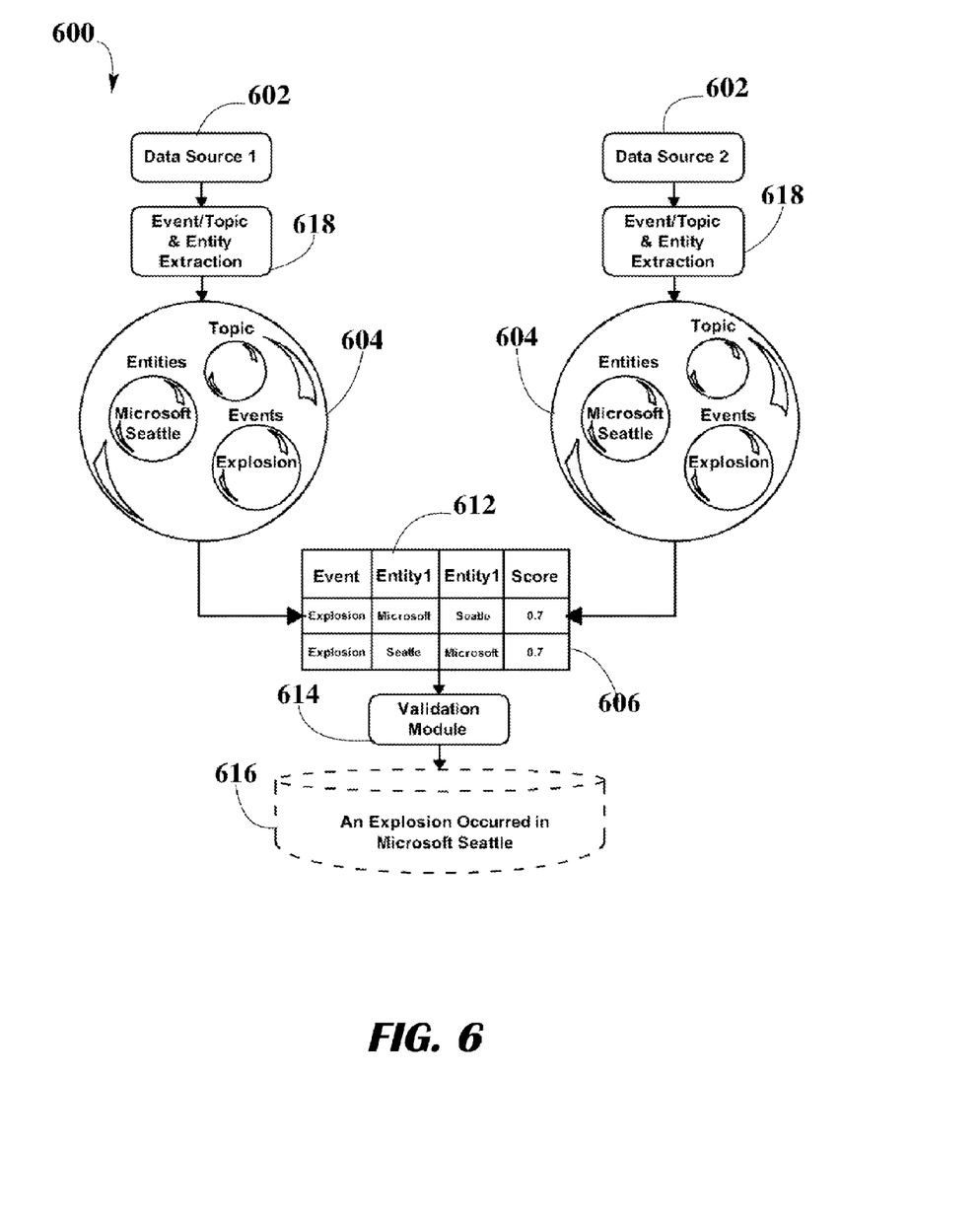
FIG. 6 is an example embodiment of an event and entity extraction and validation using different data sources.

FIG. 6 is an example embodiment of an event grouping process 600. The process may begin by taking an input from different data sources 602. Each input from data sources 602 may go through an event, topic and entity extraction 618 process. Entities, topics and event model candidates 604 are extracted from the different data sources 602. Entities, topics and event model candidates 604 from different data sources 602 may then be grouped together in spatial-temporal grouping 612 and an initial confidence score 606 may be assigned to each entity, topic and event model candidate 604 association.

Validation module 614 may compare the different records stored in the spatial-temporal grouping, and identify an overlap between entities and event model candidates 604 from each of the different data sources 602. A score may be calculated using the initial confidence score 606 from the different entities and event model candidates 604 that overlap and/or repeat themselves in different data sources 602. A score greater than a predetermined threshold may serve as an indication that the event model candidate 604 actually occurred. A verified event may then be stored in verified event store 616. In the exemplary embodiment illustrated in FIG. 6 an overlap of entities "Microsoft" and "Seattle" are extracted along with the event model candidate "Explosion" from different sources this may serve as an indication that an explosion has occurred at Microsoft®, in Seattle.

In Example #1 a tweet is extracted from Twitter® and ingested into the event extraction system 102. The tweet contains the message "Bill Gates the chairman of Microsoft was Kidnapped in Syria". The process may go through pre-processing and data normalization 204 step where stop words are removed. The process may then continue and extract entities "Bill Gates", "chairman", "Microsoft", and "Syria," in entity/topic extraction and disambiguation 206 step and extract the event model "kidnapped" using event extraction method 200. The entity extraction process may then identify Bill Gates as Chairman of Microsoft® and associate the entity with the event model for "kidnapped" in the spatial-temporal event grouping 212.

Event validation 214 may then compare the "kidnapped" event model of Bill Gates to other events models from other sources also in spatial-temporal event grouping 212. Event validation 214 may identify if other events models also refer to the "Kidnapping of the Chairman of Microsoft Bill Gates in Syria" and thus validate if the event is real. If the event is real it may be transferred to verified event store 216 where it may be used by other applications.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   in response to assigning, by a processor, a first score to a feature identified in a data stream,
      determining, by the processor, a second score for the feature via the first score and a number of occurrences of the feature in the data stream, and
      identifying, by the processor, an event candidate based on the second score satisfying a first threshold, wherein the event candidate is defined via the feature; and
   in response to comparing, by the processor, the feature against a first event model in a first data structure, determining, by the processor, that the feature does not satisfy the first event model, comparing, by the processor, the feature against a second event model in a second data structure,
      storing, by the processor, the feature as a third event model in the second data structure based on the feature not satisfying the second event model, generating, by the processor, a third score for the third event model,
      determining, by the processor, a fourth score for the event candidate based on the feature representing an event model that is not in the first data structure and the second data structure,
      comparing, by the processor, the third score and the fourth score against a second threshold of the third event model, and
      storing, by the processor, the third event model in the first data structure based on the third score and the fourth score being equal to or higher than the second threshold, wherein the first data structure differs from the second data structure based on event model data type.

2. The method of claim 1, wherein the features includes a plurality of features, and further comprising:
   identifying, by the processor, a subset of the features according to at least one of the first event model, the second event model, or the third event model; and
   determining, by the processor, a score for the subset based on a weight assigned to each of the features in the subset according to the at least one of the first event model, the second event model, or the third event model.

3. The method of claim 2, wherein each of features of the subset satisfies a threshold of the at least one of the first event model, the second event model, or the third event model.

4. The method of claim 1, further comprising:
   in response to determining, by the processor, that the feature satisfies the first event model, identifying, by the processor, an event model in the first data structure, wherein the event model is associated with the event candidate.

5. The method of claim 1, wherein the first data structure and the second data structure are distributed among a plurality of servers.

6. A system comprising:
   a processor and a memory, wherein the memory stores a set of instructions executable via the processor to:
      in response to assigning, by the processor, a first score to a feature identified in a data stream, determining, by the processor, a second score for the feature via the first score and a number of occurrences of the feature in the data stream, and identifying, by the processor, an event candidate based on the second score satisfying a first threshold, wherein the event candidate is defined via the feature;
      in response to comparing, by the processor, the feature against a first event model in a first data structure, determining, by the processor, that the feature does not satisfy the first event model, comparing, by the processor, the feature against a second event model in a second data structure, storing, by the processor, the feature as a third event model in the second data structure based on the feature not satisfying the second event model, generating, by the processor, a third score for the third event model, determining, by the processor, a fourth score for the event candidate based on the feature representing an event model that is not in the first data structure and the second data structure, comparing, by the processor, the third score and the fourth score against a second threshold of the third event model, and storing, by the processor, the third event model in the first data structure based on the third score and the fourth score being equal to or higher than the second threshold, wherein the first data structure differs from the second data structure based on event model data type.

7. The system of claim 6, wherein the features includes a plurality of features, and further comprising:
   identifying, by the processor, a subset of the features according to at least one of the first event model, the second event model, or the third event model; and
   determining, by the processor, a score for the subset based on a weight assigned to each of the features in the subset according to the at least one of the first event model, the second event model, or the third event model.

8. The system of claim 7, wherein each of features of the subset satisfies a threshold of the at least one of the first event model, the second event model, or the third event model.

9. The system of claim 6, wherein the method further comprising:
   in response to determining, by the processor, that the feature satisfies the first event model, identifying, by the processor, an event model in the first data structure, wherein the event model is associated with the event candidate.

10. The system of claim 6, wherein the first data structure and the second data structure are distributed among a plurality of servers.

\* \* \* \* \*